Figure 1:
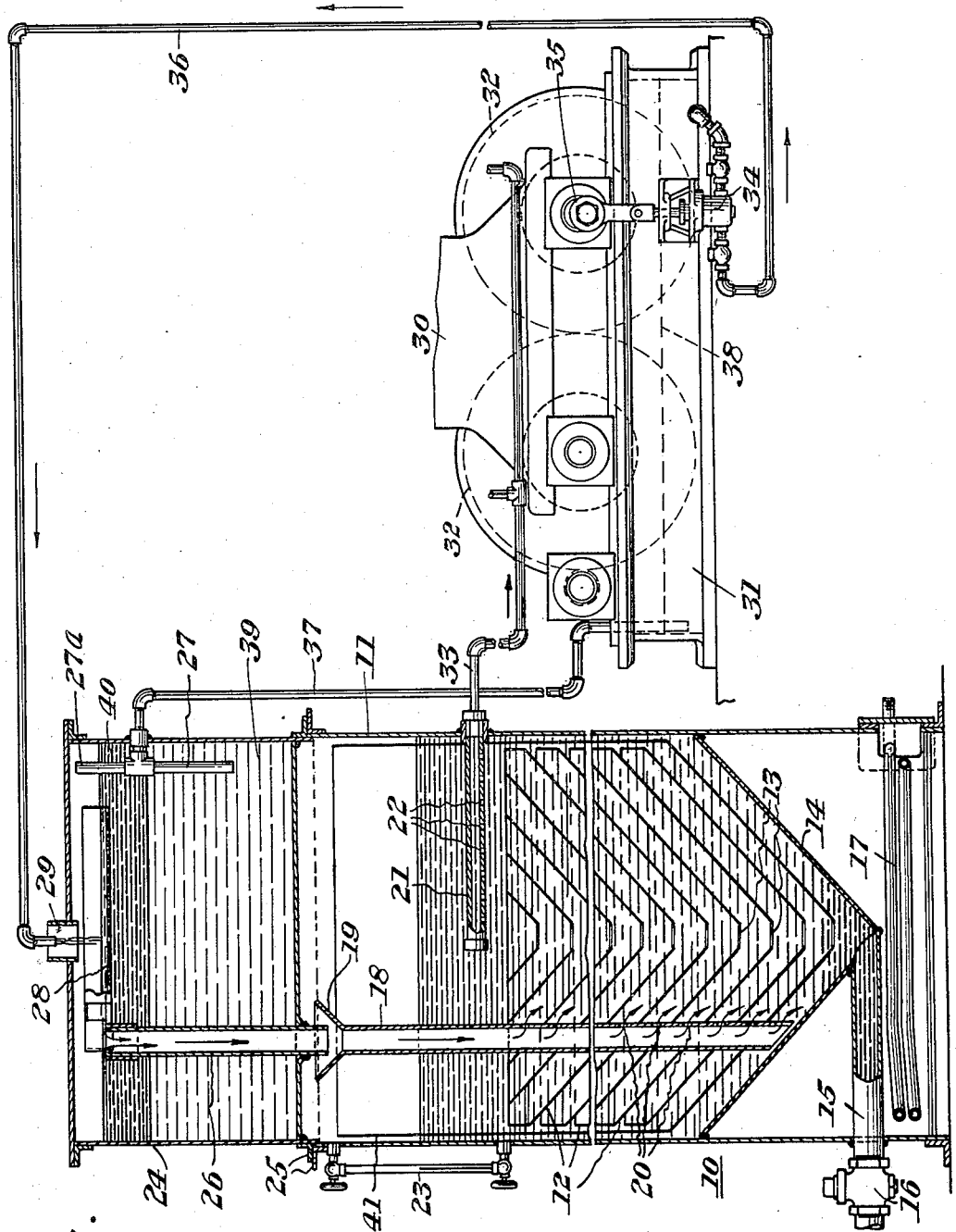

May 25, 1937. W. C. McBAIN 2,081,632
OIL PURIFIER
Filed Feb. 3, 1933 2 Sheets-Sheet 2

INVENTOR
William C. McBain
by his attorneys
Byrnes, Stebbins, Parmelee & Blenko

Patented May 25, 1937

2,081,632

UNITED STATES PATENT OFFICE 2,081,632

OIL PURIFIER

William C. McBain, Youngstown, Ohio, assignor to The Cold Metal Process Company, Youngstown, Ohio, a corporation of Ohio Application February 3, 1933, Serial No. 655,060

3 Claims. (Cl. 196—16)

My invention is concerned with the treatment of fluid for the purpose of removing suspended material therefrom such as dirt and sludge. A particular application of the invention which will be described hereinafter is the use thereof for the treatment of lubricating oil in connection with any apparatus requiring a continuous supply of fresh lubricant.

Numerous systems have been proposed heretofore for the treatment of used oil so as to recover the usable portion thereof. The prior methods with which I am familiar operate on the batch principle and are therefore objectionable since they do not provide a continuous supply of fresh oil. Another objection to prior devices of this kind is that special provision must be made for agitating the oil in the presence of a precipitating agent.

I have invented a method and apparatus for treating fluids which overcomes the objections to the prior practices. In accordance with my invention, I collect the fluid to be treated in any suitable collecting chamber and deliver a precipitating agent to the chamber. A mixture of the fluid and the agent is pumped from the collecting chamber to a separating chamber. The effect of the pumping operation is to cause a thorough mixture and agitation of the fluid and agent. In the separating chamber, I provide means for drawing off the precipitating agent from a point below the level thereof for redelivery to the collecting chamber. I also provide means for drawing off the fluid from the upper level thereof.

A settling chamber is located below the separating chamber and is provided with a plurality of conical settling trays having apex holes therein, the edges of the trays being spaced slightly from the walls of the chamber. A downcomer traverses the trays and receives fluid from the separating chamber for delivery to the trays successively. A conical sludge receiver is disposed below the trays and a suitable drain is connected thereto. Means are provided for heating the lower portion of the apparatus including the sludge receiver to insure fluidity of the sludge collected therein. The fluid rising to the top of the settling chamber has substantially the characteristics of fresh fluid and may be drawn off for delivery to the point of use.

For a complete understanding of the invention, reference is made to the accompanying drawings illustrating the present preferred embodiment, specifically applied to the treatment of lubricating oil from machinery requiring a continuous supply thereof. In the drawings:—

Figure 2:
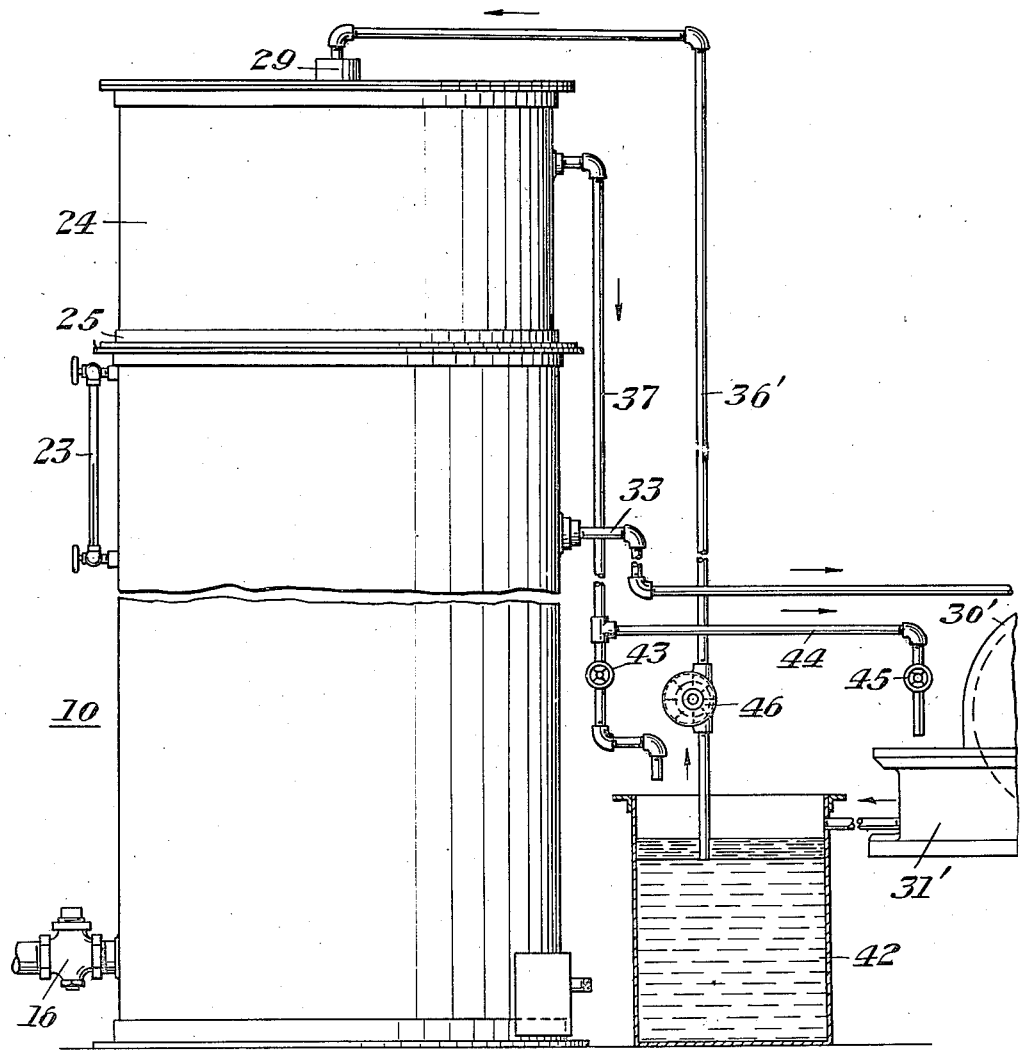

Figure 1 is a view partly in section and partly in elevation, showing the construction of the device which I prefer for carrying out the method of my invention and indicating diagrammatically the method performed; and Figure 2 is a view partly in section and partly in elevation showing a slight modification.

Referring now in detail to the drawings a preferred embodiment of the apparatus for carrying out the method of my invention is indicated generally at 10. The apparatus comprises a settling chamber 11 having a series of conical trays 12 supported therein in any suitable manner. The trays have apex openings 13. A conical sludge receiver 14 is disposed in the lower part of the chamber and communicates with a drain pipe 15 controlled by a cock 16. A heating coil 17 is disposed below the receiver 14 and may be connected to any suitable source of heating fluid such as hot water or steam.

A downcomer 18 extends from about the top of the chamber 11 down substantially to the receiver 14. It has an enlarged mouth 19 and a plurality of holes 20 for discharging fluid into the spaces between the trays. An offtake 21 is mounted near the top of the chamber 11 and has perforations 22 for receiving fluid from the chamber for delivery to the point of use. A gauge glass 23 provides a visible indication of the level of the fluid in the chamber 11.

A separating chamber 24 is mounted on top of the settling chamber 11 by means of cooperating flanges 25 on the top of the chamber 11 and the bottom of the chamber 24. A surface discharge tube 26 extends through the bottom of the chamber 24 and to a point adjacent the top thereof. The chamber 24 is positioned on the chamber 11 so that the tube 26 and the downcomer 18 are in substantial alinement. A subsurface discharge tube 27 is mounted at one side of the chamber 24. A screen filter 28 is located adjacent the top of the chamber 24 in position to receive fluid supplied through an inlet 29. The filter may be supported in any suitable manner for ready removal and dumping.

As an example of the use to which the invention may be put, I have illustrated it in connection with a cold strip mill a portion of which is shown at 30. The machine has a hollow liquid-tight base 31 on which winding and unwinding drums 32 are mounted. These drums are driven in the known manner to draw lengths of strip back and forth between the rolls (not shown) of the mill.

Lubricant for the bearings of the mill and for the strip being rolled is conducted from the upper portion of the chamber 11 by a pipe 33 connected to the offtake 21. It will be understood, of course, that the portion of the mill illustrated in the drawings is shown on a much smaller scale than the oil treating apparatus connected therewith. The latter, furthermore, will preferably be mounted above the equipment with which it is associated so that clean oil may flow therefrom to said equipment by gravity. In case such relation cannot be obtained, a pump may be employed for drawing the oil from the settling chamber and delivering it to the machinery for use. I have not shown the complete system for circulating oil to the bearings of the mill and the strip being worked therein since this forms no part of the present invention.

A reciprocating pump 34 is mounted on the base 31 and is adapted to be driven by an eccentric 35 on the shaft of one of the drums 32. Any other type of pump or drive, of course, may be employed, depending upon the nature of a given installation. The pump 34 draws fluid from the base 31 and delivers it through a pipe 36 to the inlet 29 of the separating chamber 24.

For treating oil in accordance with my invention, I prefer to employ an aqueous solution of soda ash, sodium bicarbonate, other compounds of sodium, or any alkali solution or other fluid having a coagulating or precipitating effect on the impurities in the oil. This solution is initially supplied to the separating chamber 24 in such quantity that the level there rises so that it will flow through a pipe 37 connected to the subsurface discharge tube 27, into the base 31 of the mill 30. The pipe 37 discharges into the base 31 below the level of fluid therein indicated at 38 so that a thorough mixture of the solution and the oil is effected.

It will be obvious that the fresh oil supplied to the mill, after lubricating the bearings thereof and the strip being rolled, is collected in the base 31. The principal function of the alkali solution is to act as a precipitating agent. It causes the coagulation and settling of particles suspended in the oil. The alkali solution also serves to neutralize any acid, such as pickling acid, which might be deposited in the oil from the strip being rolled in the mill 30.

The pump 34 operates when the mill is running and delivers a mixture of the precipitating solution and oil through the pipe 36 to the inlet 29 of the chamber 24. It will be apparent that the pump serves effectively to agitate and mix the oil and the precipitating solution.

The mixture of the solution and oil is discharged through the chamber 24 into the screen filter 28 which removes the largest particles from the mixture. In the separating chamber, the mixture of precipitating solution and oil tends to separate and form layers of solution and oil indicated at 39 and 40 respectively. Some of the sediment settles while the oil-solution mixture is separating and such sediment can be removed at intervals from the chamber 24 by removing the cover. The solution in the neighborhood of the mouth of the sub-surface discharge tube 27 is practically clean and flows through the pipe 37 back to the base 31. It will be noted that the discharge tube 27 is vented at 27a to prevent the siphoning of the contents of the chamber 24 into the base 31.

The tube 27 draws the precipitation agent from a location such as to insure the withdrawal of clean liquid only and allows only a limited amount of fluid to pass through the pipe 37 if the pump 34 or 46 is not in operation. The vent serves to prevent siphoning action when the level of the liquid in separating tank 24 has dropped to the level of the connection between tube 27 and pipe 37. This automatically prevents the flooding of base 31 or sump tank 42 by the draining of tank 24 when the apparatus is shut down.

The oil rising to the top of the chamber 24, when it reaches the level of the surface discharge tube 26, flows downwardly therethrough into the downcomer 18. From the latter, the partially cleaned oil flows through the holes 20 into the spaces between the trays 12. The shape of the trays is such as to promote the settling of the sediment remaining in the oil. The sediment settles onto the trays and is directed downwardly toward the center of the settling chamber.

The cleaned oil rises and is guided toward the exterior of the chamber which affords a free path to the upper portion thereof. The sludge collecting in the receiver 14 may be drawn off through the pipe 15 by opening the cock 16, and the heating coil 17 is employed to maintain the sludge in a fairly fluid condition. The gauge glass 23 indicates the level of the cleaned oil in the chamber 11 and a continuous supply may thus be maintained for re-delivery to the apparatus where the oil is used. An inner shell 41 between the wall of the chamber 11 and the trays 12 prevents the oil in the central portion of the chamber from coming in contact with the outer wall thereof and thus encourages more rapid precipitation.

Figure 2 illustrates a slight modification of the invention in which I employ a separate sump 42 for receiving used oil from the machine indicated at 30' and the coagulating solution from the treating device 10. In Figure 2, the device 10 delivers coagulating solution to the tank 42, through the conduit 37, under the control of a cock 43. Preferably the discharge end of the conduit 37 is spaced above the top of the tank 42 so that the continued flow of the solution will be visible to attendants. A branch 44 from the conduit 37 is provided for supplying coagulating solution to the base 31' of the machine 30' under the control of a cock 45. The discharge end of the branch conduit is likewise spaced above the machine base 31'. Cleaned oil is supplied to the machine through the conduit 33 as in Figure 1. The mixture of used oil and coagulating solution is drawn from the tank 42 and delivered through conduit 36' to the separating chamber of the oil treating device by a pump indicated diagrammatically at 46, which may be driven by any convenient means.

The modification of Figure 2 has utility in cases where for one reason or another it is not desirable or convenient to handle the mixture of used oil and coagulating solution in the machine base itself. The control cocks and the visible discharge of the coagulating solution may, of course, also be incorporated in the system as shown in Figure 1.

It will be apparent from the foregoing description that the invention provides a method and apparatus for continuously treating a fluid such as lubricating oil to remove suspended material therefrom. The invention also provides a simple and compact device which effects a thorough cleaning of the oil at relatively little expense.

The precipitating solution is used repeatedly and this contributes to further economy in operation. Since the pump for delivering the oil-solution mixture from the collecting chamber to the separating chamber effects a thorough mixture and agitation thereof, it is not necessary to provide special means for this purpose in the body of the apparatus itself. The fluid in the latter is always maintained quiescent and this aids the rapid settling of suspended particles.

In other words, it will be seen that my apparatus for treating oil consists primarily of three parts: First, a simplified means for mixing a precipitating agent with the oil and raising same to an elevated position; second, means for salvaging the unused precipitating agent, and third, means for settling and removing precipitated foreign matter from the oil.

In addition to the above parts upon which my oil purifier depends for normal operation, it will be noted that preferably I also use the vented submerged tube (27, 27a, Fig. 1) for withdrawing clean precipitation agent for reuse and for preventing the flooding of the collecting sump 42 (Fig. 2) or machine base (31, Fig. 1). This is preferably accomplished without manipulation of any valve on the part of the attendants. Additional apparatus in some cases may be added to the above and still come within the scope of my invention but it is the combination of these features as described that enables me to build an efficient, economical oil purifier that is suitable for continuous operation.

Although I have illustrated and described the invention as applied to the treatment of lubricating oil used in a rolling mill, it will be apparent that the invention is not limited to this application, but is useful for many other purposes.

Besides the treatment of lubricating oil, the invention is well adapted for removing suspended particles from other fluids. The rolling mill partly illustrated herein is intended merely as an example of the use of the invention in cleaning lubricating oil for machinery requiring a continuous supply thereof. It will be obvious that the invention will serve equally effectively to clean the oil supplied to any other type of machinery.

Although I have illustrated and described herein but one preferred embodiment of the invention, it will be apparent that numerous changes in the method and apparatus disclosed may be made without departing from the spirit of the invention as defined in the appended claims.

I claim:

1. An oil purifier for cooperation with an oil consuming device having a sump, comprising a treating tank, a conduit extending from a point adjacent the middle of the tank to the consuming device for carrying purified oil from the tank thereto, a transverse partition in said tank above said conduit, a conduit extending from a point below the top of the tank to the sump for carrying an aqueous coagulant fluid from the tank to the sump, a conduit extending from the sump to a point adjacent the top of the tank for delivering to the latter a mixture of used oil and the coagulant, and means for delivering oil from the upper part of the tank to a point adjacent said first-mentioned conduit.

2. A fluid treating device, comprising upper and lower chambers, said upper chamber being adapted to receive for gravity separation a mixture of oil and a precipitating agent, means for drawing off the precipitating agent from a layer formed in the upper chamber from a point below the upper level of said layer, means for drawing off oil from the top of said upper chamber and delivering it for settling to said lower chamber, a plurality of settling trays in said settling chamber, and a downcomer traversing the trays, adapted to receive oil from said last-mentioned means, and extending downwardly from the top of the settling chamber, for delivering oil received from the separating chamber to the trays, respectively.

3. The combination with an oil using apparatus including a chamber for collecting used oil, of means for delivering to said chamber an aqueous liquid for accelerating the precipitation of matter suspended in said oil, a pump connected to the chamber for withdrawing the contents thereof and mixing the liquid and the oil, an oil purifier connected to the pump having a separating chamber for receiving and separating the mixture delivered by said pump, said purifier also having a settling chamber for the removal of said suspended matter, means for delivering oil from the separating chamber to the settling chamber, and means for returning the liquid from the separating chamber to the collecting chamber.

WILLIAM C. McBAIN.